Oct. 31, 1967 W. J. JEFF 3,349,513
FISHING LURE
Filed May 13, 1965
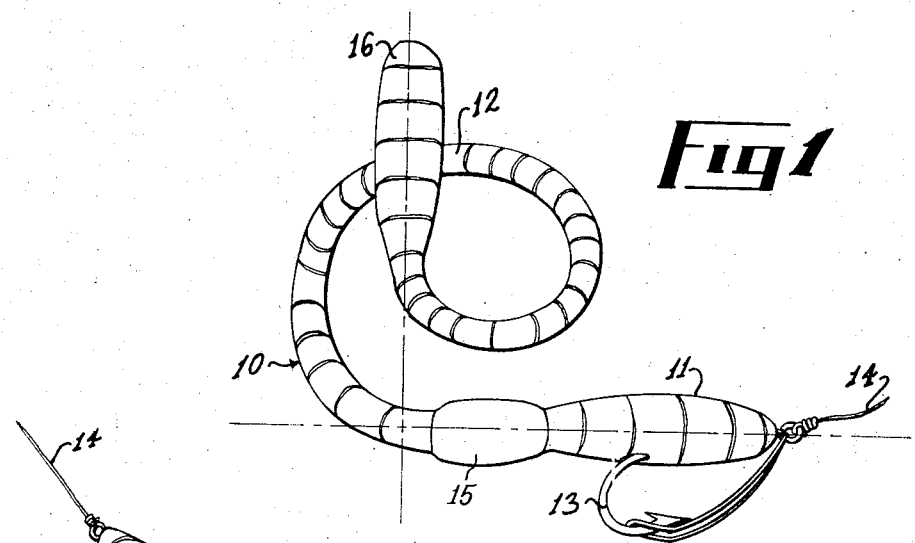
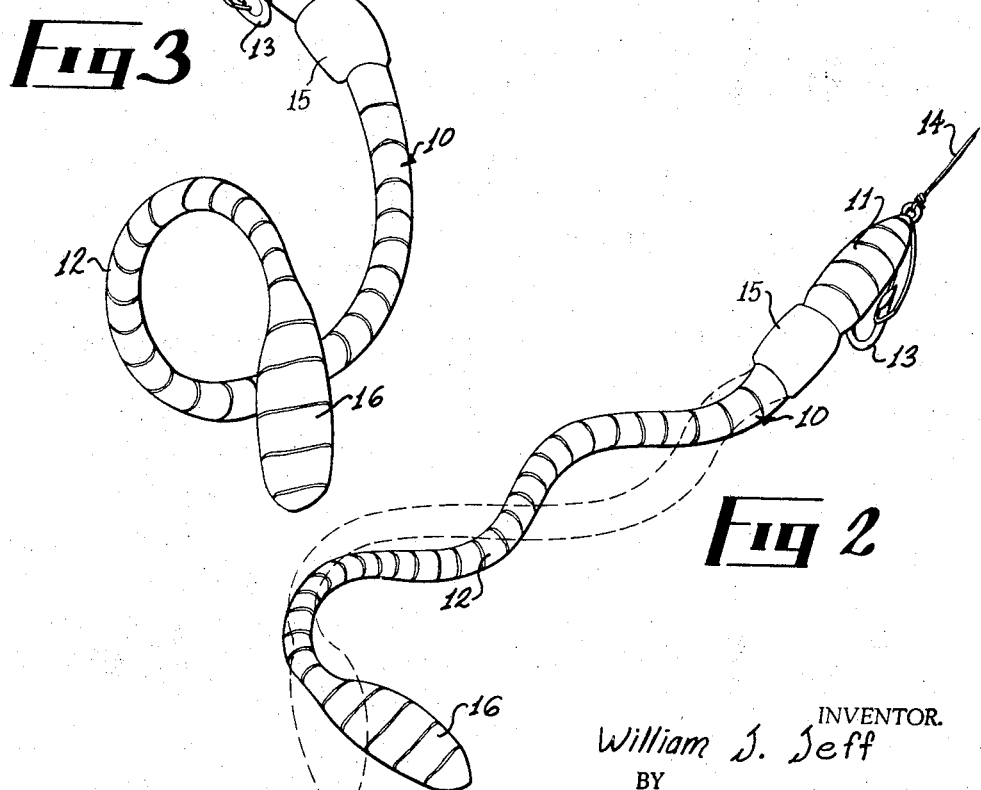
INVENTOR.
William J. Jeff
BY
Jennings, Carter & Thompson
Attorneys 3,349,513
FISHING LURE
William J. Jeff, 1312 19th Place SW.,
Birmingham, Ala. 35211
Filed May 13, 1965, Ser. No. 455,495
1 Claim. (Cl. 43—42.02)

ABSTRACT OF THE DISCLOSURE

An elongated, soft, resilient and flexible fishing lure having a head and an elongated forward portion extending in a generally straight line and having a tail portion with its end extending over an adjacent portion of the body and set in a recoverable set position in laterally spaced relation to the forward portion of the lure.

This invention relates to a fishing lure and the process of making the same and more particularly to such a fishing lure which is flexible and resilient and has the general appearance of an earthworm, eel, snake or the like.

An object of my invention is to provide a fishing lure of the character designated in which the tail portion thereof has a recoverable set position with the end thereof extending over an adjacent portion of the body whereby the tail portion of the lure overlaps itself while the head portion thereof remains in a substantially straight line.

Another object of my invention is to provide a fishing lure of the character designated in which the tail portion of the lure moves out of its overlapped position upon pulling the lure through water and then returns to its recoverable set position while the lure is not being pulled through the water, thus simulating movements of an earthworm, eel, snake or the like.

A further object of my invention is to provide a process for making a fishing lure in which an elongated, soft, resilient and flexible body is formed of a thermoplastic material which will retain a recoverable set position after being heated above a predetermined temperature and then cooled while in the set position for a predetermined length of time, one end of the body being positioned over an adjacent portion of the body while the body is heated to a temperature above the predetermined temperature to define an overlapped end portion which retains a recoverable set position after being cooled for a length of time while in the set position.

A still further object of my invention is to provide a process for producing fishing lures of the character designated which shall be extremely simple to carry out and requires a minimum of time, thus particularly adapting my process for forming the lures by mass production.

A fishing lure embodying features of my invention and which is formed by my improved process is illustrated in the accompanying drawing, forming a part of this application, in which:

FIG. 1 is a top plan view showing the body of the lure in the position that it is retained in while being cooled to form the recoverable set position of the overlapped end portion thereof;

FIG. 2 is a perspective view showing the lure being pulled through water; and,

FIG. 3 is a perspective view showing an intermediate position that the end portion of the lure assumes.

Referring now to the drawing for a better understanding of my invention, my improved lure comprises an elongated, soft, resilient and flexible body 10 having a head portion 11 and a tail portion 12 bent in a curve to one side of body 10. Passing through the head portion 11 is a hook 13 which is secured to a fishing line 14 whereby the lure may be pulled through water. As shown in the drawing, the lure simulates the appearance and movement of an earthworm, eel, snake or the like. The body 10 is larger adjacent the head portion 11 in a forward portion 15. The tail portion 12 may be provided with a relatively flat end portion 16 which serves as a fin-like member to aid in movement of the tail portion 12 relative to the head portion 11 whereby the tail portion 12 moves from the solid line position shown in FIG. 2 to the dotted line position to produce a life-like appearance.

As shown in FIGS. 1 and 3, the tail portion 12 is provided with a recoverable set position with the end 16 thereof extending over an adjacent portion of the tail portion 12. That is, the tail portion 12 is bent over to one side of the adjacent portion of the body 10 with the end 16 coiled to overlap an adjacent portion of tail portion 12 and then preset whereby the tail portion 12 tends to return its original set position while there are no forces exerted against the tail portion, as would be the case where the lure is drawn through the water.

The lure is made by first forming the elongated, soft, resilient and flexible body 10 of a thermoplastic material which will retain a recoverable set position after being heated above a predetermined temperature and then cooled while in the set position for a predetermined length of time. The body 10 thus formed of this thermoplastic material is heated to a temperature above the predetermined temperature and, while at this temperature, the end 12 is bent to one side of the adjacent portion of the body 10 and end 16 coiled to overlap the adjacent portion of tail portion 12, as shown in FIG. 1. The body 10 is then cooled while the end 16 is thus positioned over the adjacent portion of the tail portion 12 for the predetermined length of time whereby the end 16 retains a recoverable set position in overlapping relation to the adjacent portion of the tail portion 12. In actual practice, I have found that a suitable thermoplastic material is a dispersion of polyvinyl chloride polymer and/or co-polymer resins in a plasticizer. The plasticizer may be, but is not limited to, phthalate esters of high boiling alcohols. Modifiers, usually in the form of metallic soaps, are added to stabilize the compound against heat and light degradation. Also, pigments are added for color.

Where the thermoplastic material comprises polyvinyl chloride resins and/or copolymers thereof, the lure body 10 is heated to a temperature ranging from approximately 210° F. to 250° F. and is then allowed to cool while in the recoverable set position shown in FIG. 1 for approximately 10 to 30 minutes at ambient temperature. It will be apparent that the lure body could be cooled for a longer period of time where it is not desired to remove the lure body from its recoverable set position for packaging or the like. That is to say, the lure body should remain in the recoverable set position shown in FIG. 1 for at least 15 to 30 minutes while being cooled.

In actual practice, I have found that excellent results are obtained by immersing the lure body 10 in boiling water whereby the body is heated to a temperature of approximately 212° F. This not only facilitates heating of the lure body in that no heating ovens are required but each lure body is heated to this temperature throughout the entire thickness thereof to thus asure that a recoverable set position is retained by each lure body upon cooling the same as described hereinabove.

As shown in FIG. 1, the head portion 11 and the forward portion 15 of the lure body 10 adjacent thereto extend in a straight line generally perpendicular to the end portion 16 which is in overlapped relation to the adjacent portion of the tail portion 12. By extending the head portion 11 and the portion of the body 10 adjacent thereto in a generally straight line, the lure does not rotate about its longitudinal axis, thus preventing the fishing line 14 from becoming twisted as the lure is drawn through the water. Accordingly, substantially all of the wiggle movements of the lure are in the tail portion thereof.

From the foregoing description, the process of making my improved lure and the operation thereof will be readily understood. The elongated, soft, resilient and flexible body 10 formed of a suitable thermoplastic material, as set forth hereinabove, is heated to the required temperature. The body 10 is then placed on a relatively flat surface in the position shown in FIG. 1 with the tail portion 12 curved to one side of body 10 and end portion 16 overlapping the adjacent portion of the tail portion 12. The head portion 11 is positioned whereby the head portion and the forward portion 15 of the body adjacent thereto extend in a generally straight line perpendicular to the end portion 16. After thus positioning the body 10, the body is permitted to cool for the required time to retain a recoverable set position in the overlapping end portion 16 relative to the adjacent portion of the tail portion 12. After thus providing the recoverable set position in the tail portion 12, the hook 13 is inserted in the head portion 11, as shown, and the line 14 is attached to the hook. While I have shown a hook 13 as being attached to the head portion only, it will be apparent that another hook or hooks could be provided along the length of the body 10. As the lure is drawn through the water, the lure moves to the extended position shown in FIG. 2, whereby the tail portion 12 wiggles from side to side to assume the solid line position and dotted line position shown in FIG. 2. Upon slacking the line or stopping the movement of the lure through the water, the tail portion 12 tends to return to its original, preset position, as shown in FIG. 1. It will thus be seen that so long as the lure is being drawn through the water, the tail portion 12 will wiggle, as shown in FIG. 2. On the other hand, while the lure is not being pulled through the water, the tail portion 12 assumes the position shown in FIG. 1 whereby it simulates the movement of a worm attempting to coil about a limb or another member in the water.

From the foregoing, it will be seen that I have devised an improved lure and process for forming the same. By providing the tail portion of the lure body with a recoverable set position with the end thereof extending over an adjacent portion of the body, substantially all of the wiggle or other movements of the lure are in the tail portion thereof thus further simulating the movement of a worm, eel, snake or the like and at the same time preventing the lure from rotating about its longitudinal axis to twist the fishing line. Furthermore, by providing a process wherein the tail portion retains the recoverable set position in overlapping relation to the adjacent portion of the body by first heating the lure and then cooling the lure in the preset position, the lure body may be formed in a minimum of time and with a minimum of effort. Furthermore, by forming the lure whereby the head portion and the adjacent forward portion of the body extend in a generally straight line, together with the preset, overlapped tail portion, the lure further simulates the actual movement of a worm, eel, snake or the like and further restrains rotation of the lure about its longitudinal axis as it is drawn through the water.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In a fishing lure having an elongated body formed of a soft, resilient and flexible plastic material that will retain a recoverable set position after being heated above a predetermined temperature and then cooled while in the set position for a predetermined length of time, the improvement which comprises:

(a) a head portion joined to an elongated forward portion of said body, with said head portion and said forward portion of the body extending in a generally straight line, and (b) a tail portion for said elongated body curved to one side of said body and having its end extending over an adjacent portion of said tail portion of said body and set in said recoverable set position in laterally spaced relation to said forward portion of the body so that upon pulling the lure through water substantially all wiggle movement thereof is in said tail portion thus preventing rotation of the lure about its longitudinal axis.

References Cited

UNITED STATES PATENTS

| 2,500,494 | 3/1950 | Jeffers | 43—42.53 X |
| 2,563,522 | 8/1951 | Fisher | 43—42.24 |
| 3,100,360 | 8/1963 | Creme | 43—42.24 X |

OTHER REFERENCES

Rose: The Condensed Chemical Dictionary, sixth edition, page 1053, published by Reinhold, New York, 1961.

SAMUEL KOREN, *Primary Examiner.*

D. J. LEACH, *Examiner.*